Patented May 30, 1950

2,509,261

UNITED STATES PATENT OFFICE 2,509,261

METHOD OF FILTRATION

Michael Carosella, Niagara Falls, N. Y., assignor to United States Vanadium Corporation, a corporation of Delaware No Drawing. Application April 19, 1946, Serial No. 663,644

1 Claim. (Cl. 210—62)

The invention relates to an improved method of filtration and more particularly to the filtration of sand-slime mineral pulp from a neutral or weakly acid aqueous medium.

Certain ores, particularly clastic or sedimentary types, are composed of fragments or sand particles, united by cementitious material. Upon comminution of such ore, as in dressing operations, a large quantity of the cementitious material is reduced to a pulverulent state effectively stripping it from sand particles. The addition of water to the comminuted mass forms a slime of the pulverulent cementitious material and upon still further addition of water the slime takes on the characteristics of a colloidal dispersion.

The coexistence of sand and slime impedes filtration procedures. In conventional gravity filtration the sand settles rapidly and the more slowly settling slime forms a compact layer on the upper surface of the settled sand, thereby hindering further fluid passage. In operations employing commercial filters of the drum or disc type, the settled sand impedes or halts motion of the filter sector and, as the supernatant liquid is drawn off, the suspended slimes clog the filter pores rendering continued filtration difficult or impossible.

It is known that particles in colloidal dispersion possess an electric charge, either positive or negative, and that by treatment with certain electrolytes, the charge may be neutralized and the particles coagulated and precipitated. In filtration operations, particularly in the washing stage, as the electrolyte is leached from the precipitated solid phase, peptization may occur, with the result that the precipitate reverts to its original colloidal condition, and either passes through or clogs the filter pores.

It is an object of the invention to provide a means for flocculating or coagulating slimes or other colloidally dispersed material in a neutral or weakly acid aqueous medium to obtain a precipitate amenable to conventional filtration operations.

Another object is to lower the pulp density threshold at which settling of the sand-slime mixture occurs.

A further object is to maintain a uniform distribution of sand and flocculated slimes throughout the filtering operation, thereby increasing the permeability of the resulting filter cake and, in addition, enabling relatively free and uninterrupted movement of the sector of a continuous filter.

The present invention is based upon the discovery that the aforecited objects may be attained by the addition of a small amount of an appropriate amine to a sand-slime mineral pulp in a neutral or slightly acid aqueous medium. Appropriate amines comprise tertiary amino alcohols and their fatty acid esters. To obtain a maximum effect with a minimum usage of the amine, the amine should contain at least 10 and preferably at least 16 carbon atoms. Among tertiary amino alcohols those having an alkyl group containing at least 4 carbon atoms attached to the nitrogen atom are particularly suitable for use in the invention. An example is di-octyl-ethanol-amine which compound is among those used to illustrate the invention. Higher fatty acid esters of tertiary amino alcohols are likewise satisfactory. Examples are di-ethyl-amino-ethyl oleate, di-methyl-amino-ethyl laurate, and di-ethyl-amino-ethyl laurate which compounds also are among those used to illustrate the invention.

Data are given in the table from tests illustrating the effectiveness of the invention on a material exhibiting poor percolating properties due to the coexistence of coarse and fine particles, the latter causing clogging of the filter pores and reducing the rate of liquid flow through the filter cake. The tests show the relative buoyancy imparted to the slimes by the amines, the term buoyancy referring to the apparent property of the flocculated slimes to support the sand particles and maintain them in uniform dispersion in the aqueous medium. The relative time required to percolate water through the several filter cakes is also shown.

In each test 100 parts of the comminuted material containing coarse and fine particles were pulped with 350 parts of water and boiled for 5 minutes. An amine, as indicated in the table, was then added in an amount equal to two pounds per ton (2000 pounds) of dry solids present in the aqueous medium. The amine was added as a 1% solution to which had been added a small amount of hydrochloric acid to clear the solution. Buoyancy of the sand-slime mixture was determined by observing the amount of clear liquor after five minutes' settling time. The mixture was then shaken and filtered on a Buchner funnel and a determination made of the time required to percolate 100 c. c. of water through the filter cake.

Table

| Example No. | Amine added [1] | Buoyancy | Time to percolate 100 c. c. Water through filter cake in minutes |
|---|---|---|---|
| 1 | none | poor | 12.0 |
| 2 | Diethylaminoethyl oleate | good | 8.5 |
| 3 | Dimethylaminoethyl laurate | do | 8.0 |
| 4 | Diethylaminoethyl laurate | do | 6.5 |
| 5 | Dioctyl ethanolamine | do | 6.5 |
| 6 | Imidizol-1 ethylamine-2 heptadecene 8 | poor | 22.0 |

[1] As 1% solution, slightly acid. Ratio of quantity of amine to material being treated (dry solid equivalent) was 1:1000.

In the table, Example 1 had no amine treatment, Example 6 was treated with an amine not in the class employed in the invention, and Examples 2, 3, 4 and 5 were treated in accordance with the invention with amines from the class comprising tertiary amino alcohols and their fatty acid esters. In Examples 1 and 6 buoyancy was poor, whereas in Examples 2, 3, 4 and 5, made according to the invention, the buoyancy was entirely satisfactory. In addition, the filtering rate in Examples 2, 3, 4 and 5 was considerably faster than in Examples 1 and 6.

Imidizol-1 ethylamine-2 heptadecene 8, used in Example 6, is unsatisfactory as a filter aid in the treatment of sand-slime pulp in a neutral or weakly acid aqueous medium. However, this amine and others of the class comprising glyoxalidines having a substituent in the 2-position which is a member of the group consisting of higher alkyl and alkenyl radicals are most satisfactory as filter aids in the treatment of sand-slime pulp in an alkaline aqueous medium and such treatment with these amines is the subject of another invention disclosed in a copending application, Serial No. 663,643.

Often, desirable mineral values are dissolved in the aqueous medium associated with a sand-slime pulp. To recover these values by filtration requires a uniform suspension of sand and slime. Such a suspension is difficult to maintain as dilution leads to rapid segregation of the sand. For example, a digested pulp of the sand-slime type was adjusted to 75% solids at which concentration the pulp remained in uniform suspension in the aqueous medium. Dilution to 50% solids, however, led to a rapid segregation of sands thus increasing the difficulties of filtration operations. Treatment of this same pulp with an amine according to the invention made possible dilution to 50% or less solids without disturbing in any way the uniform quality of the sand-slime suspension.

The ability to lower the settling threshold of sand-slime pulp and maintain a uniform suspension at lower pulp concentrations, made possible by the invention, has definite economic value. For example, with a pulp containing 50% solids, a recovery of 97% of the soluble mineral values was accomplished in four repulpings, whereas with a pulp containing 75% solids, seven repulpings were necessary to effect the same recovery.

It is to be understood that the invention is not limited to or by the compositions of the sand-slime materials set forth in this specification but is applicable to the treatment of a number of other materials of like character wherein the particle size may range from colloidal dimensions to the dimensions of common sand. It is also to be understood that the term amine as used in this application includes salts of the amine as, for example, the hydrochloride, sulphate, or acetate of the amine, in fact when the water solubility of the amine salt is greater than that of the amine the salt may be preferred. The invention has a wide range of applicability in the filtration art and is not to be construed as limited to the examples given or to their specific mode of operation. For example, the ratio of quantity of amine to material being treated (dry solid equivalent) was 1:1000 in the cited examples. This is not to be construed as a necessary lower limit. The quantity of amine to be used depends to a large extent on the nature of the sand-slime pulp and with many mineral pulps of this character a smaller quantity of amine may be effective in improving filtration rates.

What is claimed is:

Method of preventing the formation of a segregated impervious layer of pulverant cementitious material when filter-washing a sand-slime mineral pulp in a neutral or weakly acid aqueous medium, comprising adding to said aqueous medium an amine from the class consisting of tertiary amino alcohols and their fatty acid esters in an amount equal to about two pounds of said amine to each ton (2000 pounds) dry solid basis, of solids present in said aqueous medium; agitating said aqueous medium until a uniform suspension of sand and slime is produced; withdrawing a portion of said aqueous medium to produce a permeable mass of uniformly intermixed sand and slime; and thereafter filter-washing said permeable mass of sand and slime to remove soluble material therefrom.

MICHAEL CAROSELLA.

REFERENCES CITED

The following references are of record in the file of this patent:

UNITED STATES PATENTS

| Number | Name | Date |
|---|---|---|
| 2,053,024 | Dreyfus | Sept. 1, 1936 |
| 2,247,711 | Ralston et al. | July 1, 1941 |
| 2,290,880 | Katzman et al. | July 28, 1942 |
| 2,315,734 | Ralston et al. | Apr. 6, 1943 |
| 2,358,055 | Cahn | Sept. 12, 1944 |